United States Patent [19]

Kageyama et al.

[11] Patent Number: 5,030,466
[45] Date of Patent: * Jul. 9, 1991

[54] METHOD FOR PRODUCING BREAD FROM PRESERVED DOUGH

[75] Inventors: Minoru Kageyama; Mikio Kobayashi, both of Tochigi, Japan

[73] Assignee: Rheon Automatic Machinery Co., Ltd., Utsunomiya, Japan

[*] Notice: The portion of the term of this patent subsequent to Aug. 7, 2007 has been disclaimed.

[21] Appl. No.: 383,377

[22] Filed: Jul. 20, 1989

Related U.S. Application Data

[63] Continuation-in-part of Ser. No. 213,753, Jun. 30, 1988, Pat. No. 4,946,699.

[30] Foreign Application Priority Data

Jul. 26, 1988 [JP] Japan .................................. 63-206525

[51] Int. Cl.⁵ .................................................. A21D 6/00
[52] U.S. Cl. ........................................ 426/502; 426/19; 426/27; 426/504; 426/549
[58] Field of Search ................... 426/19, 27, 502, 504, 426/549

[56] References Cited

U.S. PATENT DOCUMENTS 4,093,749  6/1978  Sternberg ............................. 426/20

Primary Examiner—Marianne Cintins
Assistant Examiner—Helen Pratt
Attorney, Agent, or Firm—Guy W. Shoup; Thomas S. MacDonald

[57] ABSTRACT

A method is provided for producing bread of a good quality from frozen dough. In this method dough is stretched while being subjected to vibrations so that the dough can be stretched without imparting pressure exceeding the yield point of its elasticity. Thus during the stretching step the gluten network of the dough is unharmed. Further, the dough is rested at least five minutes within a temperature range of 0° C. to 16° C., before it is stretched. Such a dough rested at such a cool condition can be readily stretched, and the stability of the stretched dough is improved over the prior art.

7 Claims, 5 Drawing Sheets

METHOD FOR PRODUCING BREAD FROM PRESERVED DOUGH

RELATED APPLICATION

This application is a continuation-in-part of application Ser. No. 07/213,753, entitled "Method for Producing Bread From Preserved Dough", of Minoru Kageyama and Mikio Kobayashi, filed on Jun. 30, 1988, now U.S. Pat. No. 4,946,699.

BACKGROUND OF THE INVENTION

1. Field of the Invention

This invention relates to a method for producing bread from preserved dough. In particular, it relates to a method for producing bread of a good quality by baking or drying dough that is especially prepared and then quickly frozen, and thereafter preserved for a long time.

2. Prior Art

Much effort has been made in the past so that freshly baked bread could be eaten at home. Making bread at home is difficult since fermenting dough requires controlling the time, temperature, and humidity to which the dough is subjected, and it needs special skills or knowledge. To enable consumers to eat bread fresh out of an oven, while circumventing the complicated part of the bread-making process, a method has been conceived wherein dough is frozen after a fermentation step and is preserved for an indefinite period, and is then sold to consumers who will then either bake the frozen bread to eat it or who may instead preserve the bread for future consumption. By this method anyone can enjoy fresh bread by merely baking the frozen dough.

The problem with this type of bread has been that dough thus frozen and preserved cannot expand while it is being baked as much as can the ordinary type of bread.

Japanese Patent Early-publication No. 49-41556 discloses a method for freezing dough for bread, doughnuts, or the like. In this patent dough shaped into a desired form is rapidly frozen after a fermentation step. This publication describes avoiding the problem of insufficient dough expansion by applying a chemical intumescent agent (an expansion agent) to the dough.

Japanese Patent Early-publication No. 61-205437 also discloses a method for producing frozen dough in which dough is frozen after a fermentation step. This publication describes avoiding the problem of insufficient dough expansion by applying water, milk, or beaten eggs to the surface of the dough, after the fermentation step, so that the dough can expand sufficiently during the baking step.

The conventional automated bread production method comprises the steps of: (1) mixing the necessary ingredients and kneading them to make a dough mass, (2) measuring and dividing said dough mass into small pieces of a uniform size, (3) shaping said pieces into balls, (4) resting the dough balls for about 25 minutes, (5) degassing the dough balls, (6) shaping the balls into a desired form, (7) fermenting the shaped dough, and (8) baking the shaped dough. Therefore, at least eight steps are required for baking the bread. In this method, the dough is rested or left to stand for about 25 minutes after the dividing step so that the gluten network that was broken during the preceding dividing step can be restored. To improve the restoration of the gluten network in the conventional process, in addition to the resting step, an oxidizing agent such as ascorbic acid and/or potassium bromate is generally mixed with the materials used for the dough. This leads to bread of a good quality. However, freezing such dough for preservation does not give a good quality bread when it is baked after preservation.

Conventionally, the quality of the bread obtained by baking after preservation is considerably lower than bread made from dough which is baked immediately after the fermentation step but without preservation. More particularly, a specific volume of at least from 4 to 4.5 cc/g is generally attained when croissant dough is baked without freezing, while a specific volume of only from 2.5 to 3 cc/g is obtained when the dough is baked after being frozen and preserved. This results in an inferior product that is harder than ordinary bread.

In the prior art croissant dough freezing and preserving processes, the dough greatly expands during a fermentation step, where the dough is typically subjected to a temperature of 34° C., and a humidity of 80%, for 50 minutes, but is greatly deflated during the freezing process, and it does not recover the lost volume in the baking process. Further, when the dough deflates after it expands, the surface of the dough becomes wrinkled and uneven or cracked. This is why inferior bread is produced from dough frozen and preserved according to the prior art processes.

To avoid the deflation causing wrinkles and cracks, in the prior art the dough is subjected to a fermentation time shorter than the time for the conventional breadmaking. For instance, if the dough is for a croissant, it is fermented for 30 minutes instead of the conventional time of 50 minutes. In this case, the dough expands less than the dough fermented for the conventional time. Thus, the dough is deflated less in the freezing step than the dough that is frozen after the conventional fermentation period and its surface becomes less wrinkled and smoother. However, the finished bread from such dough does not expand as much as the regular bread baked from the dough of the conventional fermentation step even though it expands a little during the baking step.

An earlier application of the assignee of this invention, U.S. patent application Ser. No. 213,753 now U.S. Pat. No. 4,946,699 discloses a method for producing bread from preserved dough.

After experiments and careful observation of the prior art processes, the inventors of that application had discovered that the damage to the gluten network in dough is the cause for the deflation during the freezing step and the inferior expansion during the baking step. In the method of that application the dough is stretched while being subjected to vibrations so that the dough can be stretched without a pressure being imparted that exceeds the yield point of its elasticity. Thus the gluten network structure is unharmed. Then the dough goes through the step of cutting, shaping, fermentation, and freezing for preserving. After a desired preservation period the dough is baked. Since the dough does not become deflated during the freezing step, and expands further during the baking step, puffy and tasty bread results.

SUMMARY OF THE INVENTION

The object of this invention is to improve the method disclosed in the assignee's earlier application, by adding a resting step under a preselected temperature condition.

In this invention a method for producing dough for bread or pastry is provided, consisting of the steps of: (a) mixing and kneading various materials such as yeast, water, sugar, flour, or the like, that are required for producing a desired type of bread, to make a dough mass, (b) resting said dough for at least five minutes while it is maintained within a temperature range of 0° C. to 16° C., (c) stretching said dough into a dough strip while subjecting it to vibrations, (d) cutting and shaping said dough strip into dough pieces of a desired form, (e) fermenting said dough pieces, (f) freezing said dough pieces, and (g) preserving said frozen dough pieces for a desired length of time.

In the method of this invention, before the dough is stretched it is rested at least five minute while it is maintained within a temperature range of 0° C. to 16° C., so that the resting can soften the dough, which became hard because of the setting of the protein.

Further, where dough is maintained at a temperature between 0° C. and 16° C., the elastic recovery of the dough becomes low, and thus the stability of the stretched dough improves. In such a cool dough the thixotropic effect is clearly generated. Thus the dough is easily stretched without its gel structure being damaged. For pastry dough, the dough that is cooled down during the resting step is prevented from rising near the melting point of the oil and fat layers in the dough. Therefore, the oil and fat layers are effectively prevented from melting and mixing with the dough layers in pastry dough.

EMBODIMENTS

Figure 1:
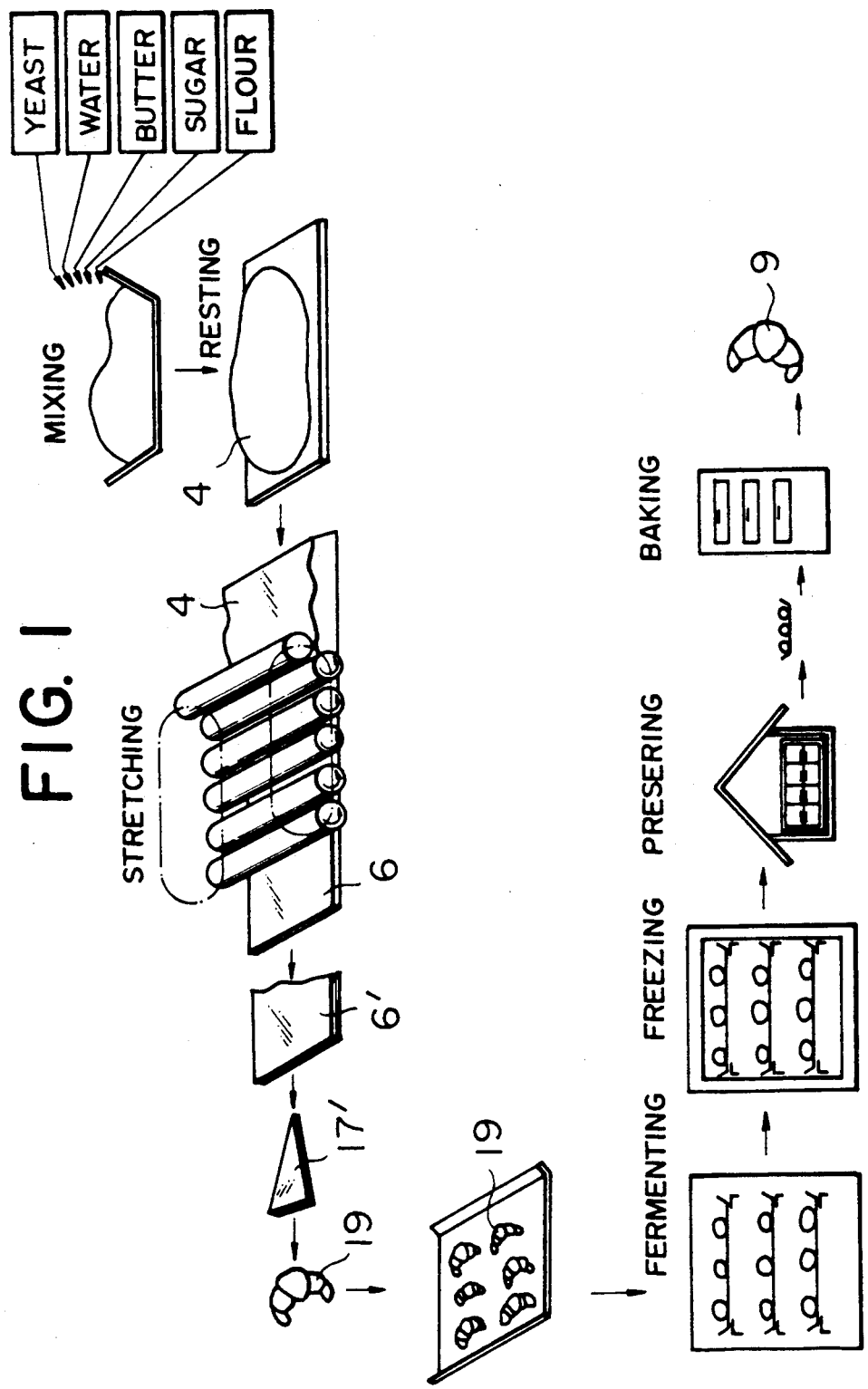
FIG. 1 shows the sequence of steps to produce French bread by the method of this invention.
Figure 3:
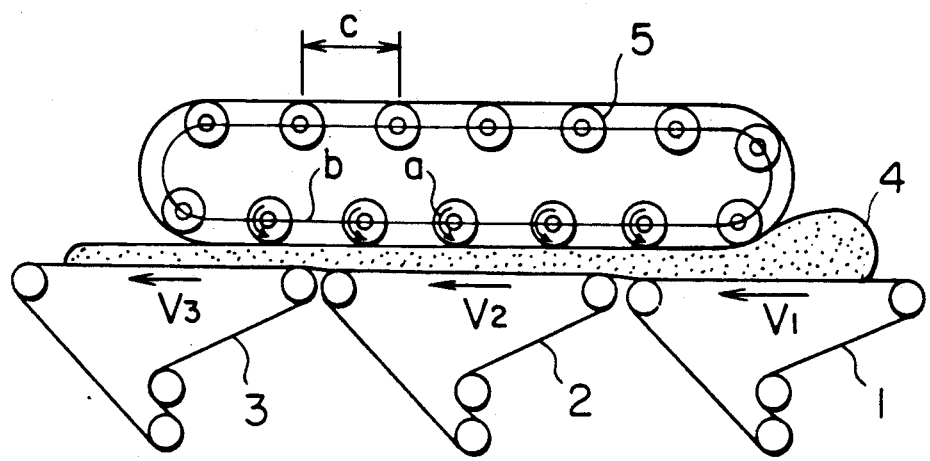
FIG. 3 shows the roller mechanism and the conveyor arrangement that are used to stretch dough in the process of this invention.
Figure 4:
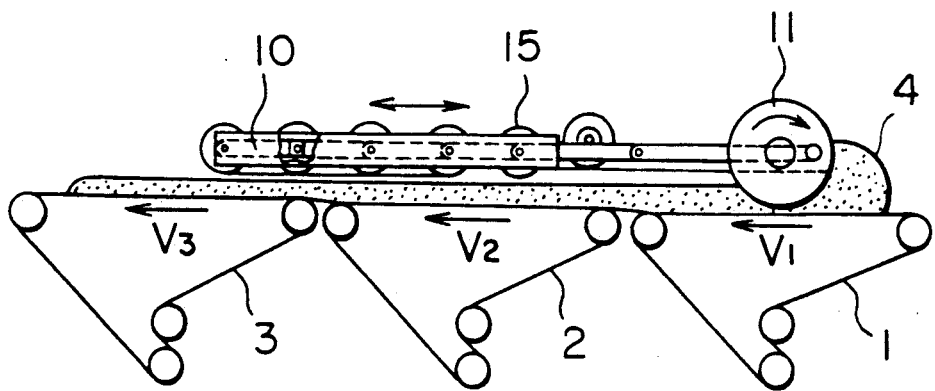
FIG. 4 shows another embodiment of the roller mechanism and the conveyor arrangement that are used to stretch dough in the process of this invention.

In the beginning of the process, as shown in FIG. 1, a dough mass (4) is produced by mixing and kneading various materials such as yeast, water, butter, sugar, flour, or the like, which are required for producing French bread. Further, the dough is rested at least five minutes, while it is maintained within a temperature range of 0° C. to 16° C., and then stretched, as shown in FIGS. 1, 3, and 4, while it is vibrated.

Figure 2:
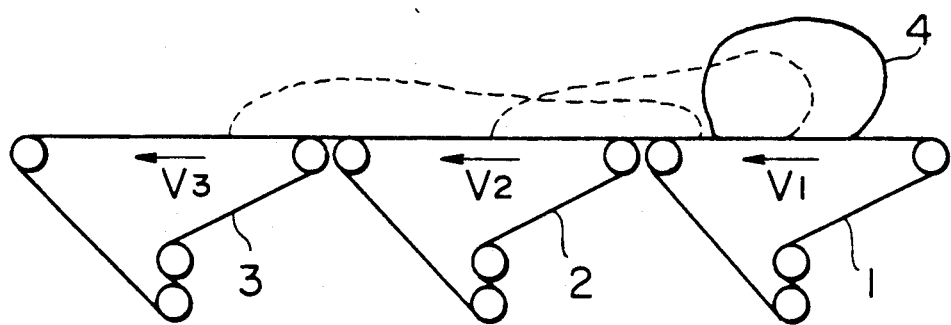
FIG. 2 shows the relationship between the dough and the conveyors, which are driven at different speeds.

In FIG. 2 the dough is stretched by placing the dough mass (4) on the conveying path formed by three conveyors (1) (2) (3). These conveyors are arranged serially and driven at different speeds. The relation among the speed ($V_1$) of the first conveyor (1), the speed ($V_2$) of the second conveyor (2), and the speed ($V_3$) of the third conveyor (3), is:

$$V_1 < V_2 < V_3$$

When the dough mass (4) is placed on the conveying path so as to extend over two or three of the conveyors (1, 2, 3), tension is continuously imparted to the dough mass (4).

In FIG. 3 a vibration-imparting roller mechanism is shown. It has a plurality of rollers (5) freely rotatable about their axes in the direction designated by the arrow a and movable along an endless roller path in the direction designated by the arrow b, and is arranged above the conveying path of the conveyors (1, 2, 3) shown in FIG. 2. The roller mechanism may be mounted to a base in any conventional way. The rollers (5) are mounted by means of bearings located around their shafts so as to be freely rotatable. The movement of the rollers in the direction b is faster than the movement of any of the conveyors. The rollers (5) are arranged in a way in which the distance c between any adjacent pair of rollers (5) is short enough so that uniform vibrations are always provided throughout the area of dough between the conveyors (1, 2, 3) and the roller mechanism. Such a roller mechanism is disclosed in U.S. Pat. No. 3,973,895, which is incorporated herein by reference.

By arranging the rollers (5) above the conveyors (1, 2, 3), the dough mass (4) is pressed by the moving rollers against the conveying path, and is effectively stretched by the conveyors, while the rollers (5) rotate and move in the directions of the arrows a and b. Thus the dough mass (4) is continuously subjected to vibrations and tension.

The stretching mechanism will now be described in detail, by reference to a certain part of the dough.

When the rollers (5) press a certain part of the dough mass (4) against the conveying path of the conveyors (1, 2, 3), this part is stretched by a tensile pressure caused by the difference in the speeds of the conveyors (1, 2, 3), and temporarily becomes thinner. The part of the dough mass (4) is then released from the rollers (5) when they move away from this part, and it partially recovers its thickness due to its elasticity. Such a process is repeated, and the pressure to the dough is repeatedly imparted and removed, which causes vibrations in the dough. As a result, fluidity appears in the dough. Such a phenomenon is called a thixotropic effect, and the part of the dough mass subjected to vibrations is stretched and permanently becomes thinner, without any pressure near or higher than the yield point of the elasticity of the dough having been imparted. Thus in this invention no high pressure that might damage the gluten network structure of the dough is provided to the dough.

As discussed above, in this invention the dough mass (4) is rested at least five minutes, while it is maintained within a temperature range of 0° C. to 16° C., before the dough is stretched. The resting step softens the dough mass (4) that has become hard because of the setting of the protein. In addition to this effect, such resting at low temperatures of this invention provides noticeable effects to the dough mass (4). First, because of the low temperature condition, the elastic recovery of the dough becomes low. Therefore, the stability of the stretched dough obtained by the stretching step improves. Second, the thixotropic effect is clearly generated in the dough and damage to the gel structure of the dough is reduced. Further, in the case of pastry dough, after the dough mass is stretched into a thin sheet, a plastic oil and fat layer such as a butter layer is placed on the dough sheet and the dough sheet is folded to sandwich the oil and fat layer between each two dough layers. When the ambient temperature is high and the temperature of the dough becomes higher than the melting point of the oil and fat, the oil and fat layer melts and mixes with the material of the dough layer during the later stretching step. Thus the quality of the dough becomes poor. However, in this invention, the dough is cooled down during the resting step and its temperature is prevented from rising near the melting point of the oil and fat. Thus, the dough is prevented from becoming a product of poor quality.

FIG. 4 shows another roller mechanism to impart vibrations to the dough without subjecting it to a pressure greater than the yield point of its elasticity. This roller mechanism includes a plurality of rollers (15) freely rotatable about their axes along a straight path. These roller (15) are connected by a pair of connecting arms (10) at both their ends. At the upstream end of each of both arms (10) a disc (11) is provided to move the rollers (15) back and forth along the straight path. Such a roller mechanism is disclosed in U.S. Pat. No. 4,692,110, which is incorporated herein by reference.

Figure 7:
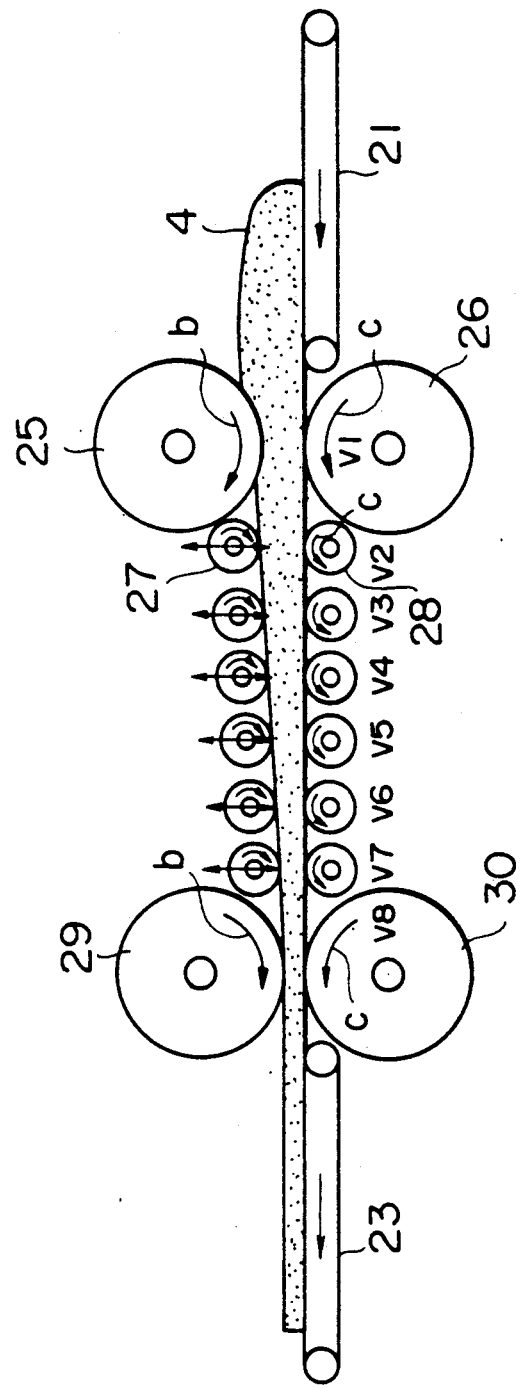
FIG. 7 shows still another embodiment of the roller mechanism and the conveyor arrangement that are used to stretch dough in the process of this invention.

FIG. 7 shows still another roller mechanism to stretch the dough while imparting vibrations to it, without subjecting it to a pressure greater than the yield point of its elasticity. This mechanism is mounted to a base in any conventional way and includes a supply conveyor (21), a pair of supply rollers (25, 26), a pair of discharge rollers (29, 30), a plurality of upper rollers (27), a plurality of lower rollers (28), and a discharge conveyor (23). The plurality of upper and lower rollers (27, 28) are disposed between the pair of supply rollers (25, 26) and the pair of discharge rollers (29, 30).

The plurality of upper rollers (27) are connected by a pair of connecting arms (not shown) at both their ends and are freely rotatable about their axes. The upper rollers are raised or lowered, as indicated by the vertical arrows in FIG. 7, by a pair of air cylinder mechanisms (not shown), which are mounted on the base and connected to the respective ends of the arms. The lower rollers (28) are vertically juxtaposed with the respective upper rollers (27). The lower supply roller (26), the plurality of lower rollers (28), and the lower discharge roller (30), are driven in the direction c.

If the speeds of the lower supply roller (26), the first to sixth rollers of the plural lower rollers (28), and the lower discharge roller (30), are represented by $V_1$, $V_2$, $V_3$, $V_4$, $V_5$, $V_6$, $V_7$, and $V_8$, respectively, as shown in FIG. 7, the relation among the speeds of these rollers would be:

$$V_1 < V_2 < V_3 < V_4 < V_5 < V_6 < V_7 < V_8$$

The pair of supply rollers (25, 26) are vertically juxtaposed. As shown in FIG. 7, the upper roller (25) is driven in the direction b and the lower roller (26) is driven in the direction c so that the pair of supply rollers (25, 26) moves in the same direction at the area where they face each other and at the same speed $V_1$. Similarly, the pair of discharge rollers (29, 30) are vertically juxtaposed and driven in the directions b and c respectively so that they move in the same direction at the area where they face each other and at the same speed $V_8$. The belt of the supply conveyor (21) is driven at the same speed as the peripheral rotation speed of the pair of supply rollers (25, 26). Similarly, the belt of the discharge conveyor (23) is driven at the same speed as the peripheral rotation speed of the pair of discharge rollers (29, 30). The pair of supply rollers (25, 26), the plurality of upper and lower rollers (27, 28), and the pair of discharge rollers (29, 30), are so arranged that a gap formed between the straight line defined by the lowermost parts of the upper rollers (25, 27, 29) and the straight line defined by the uppermost parts of the lower rollers (26, 28, 30) becomes progressively narrower in the downstream direction.

In operation, the plurality of upper rollers (27) are repeatedly raised and lowered to impart to the dough uniform vibrations throughout the area between the plurality of upper rollers (27) and the plurality of lower rollers (28). As we explained above, the dough is stretched because of the thixotropic effect caused by the vibrations and the speed differences among the lower rollers (26, 28, 30).

When dough is stretched by the above-mentioned processes, a pressure of only about 70 g/cm$^2$ or less, which is very low compared with the other stretching processes, is applied to the dough. Thus, neither the elasticity in the dough stretched is lost nor is the network structure of the gluten damaged.

FIG. 1 shows that the stretched dough is then cut and shaped into a desired form. The stretched dough sheet is cut into pieces having any desired dimensions. Since the cutting is carried out after the dough is stretched and made into a sheet, the part of dough that is cut is minimal compared to the total volume of the dough piece obtained by cutting. Thus, the cutting does not affect the network structure of gluten in the dough, and the dough is not damaged.

Figure 5:
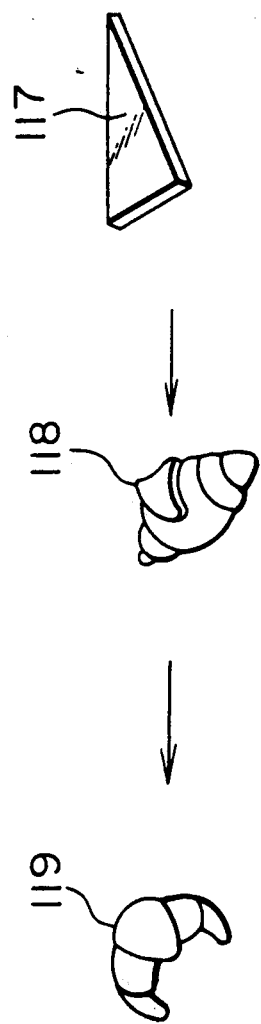
FIG. 5 shows the sequence of steps to shape a dough piece into the form of a croissant.

As shown in FIG. 1, before the dough (6) is shape into the form of a croissant, a fat layer, such as one of butter or shortening, is applied to the surface of the dough sheet (6). The dough sheet (6) is then folded to sandwich the fat layer, thereby producing pastry dough (6') having many fat layers. Then such a dough sheet (6') is stretched and cut into triangular dough pieces (17). As shown in FIG. 5, the dough piece (17) is rolled up into a spindle shape (18) and then shaped into an arched form (19).

Figure 6:
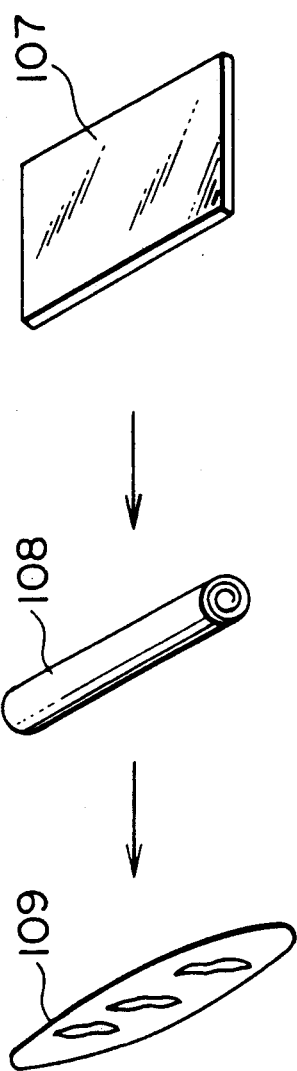
FIG. 6 shows the sequence of steps to shape a dough piece into the form of French bread.

Naturally, any type of bread can be produced from the dough sheet (6). As shown in FIG. 6, for French bread the dough (6) is cut into a rectangular dough piece (7) and then the dough piece is rolled into a bar form (8). Since French bread is not made of pastry dough, the step for forming dough and fat layers is not required. Then the dough is shaped into a long spindle form (8), and some incisions are provided in its top surface. Therefore, dough in the form of French bread (9) can be provided.

Returning to FIG. 1, the next step is a fermentation step. Regarding the dough to be shaped into a croissant form (19), it is subjected to a temperature of 34° C., and a humidity of 80% for 50 minutes. These are conventional conditions for fermentating croissant dough. As stated above, since the network structure of the gluten in the dough is not damaged during the stretching or cutting step, the step to rest the dough is not necessary after stretching or cutting it. Thus bread of a good quality can be produced without either resting the dough after stretching or dividing it, and without applying an oxidizing agent to the dough.

The dough (19) is then put in a freezer and subjected to a temperature of about −30° C., to rapidly freeze it.

Then the frozen dough is preserved in cold storage for any desired time. The dough thus preserved can be sold to consumers, who can continue preserving the dough in their own freezers.

The dough is then taken out of the freezer and baked. The shaped dough can be placed in a preheated oven at from about 185° C. to about 200° C. immediately after it has been removed from a freezer. Such dough will bake in about 13-20 minutes. No proofing or additional fermentation time is necessary as has been the case with prior art doughs. The finished croissant produced from the frozen dough fermented under the conventional conditions attains a specific volume of 4.5—5.5 cc/g and has a satisfying quality. The dough of this invention is deflated during the freezing step much less than that of the prior art methods, in which dough is not vibrated during the stretching step. It expands sufficiently during the baking step and becomes puffy and tasty bread (9). Such bread has almost the same good quality as that produced from dough that has not been preservated.

To further improve the quality of the finished bread (9), the dough of this invention is fermented under special conditions, in which the temperature is lower and the time period is longer than for the conventional method. Where the dough is for a croissant, the dough is subjected to a temperature of about 30° C.-32° C., and a humidity of about 80%, for about 70 minutes. When dough is fermented under these special conditions, it expands more than dough fermented under the conventional conditions. Such an extra expansion can compensate for the slight deflation of the dough during the freezing step. Thus, finished bread of an improved quality can be produced. The finished croissant produced from the dough of this invention and fermented under these special conditions attains a specific volume of 5.5-6 cc/g.

The following example shows the ingredients of a typical croissant dough and a preferred method of its preparation and baking.

| | Ingredients | Weight % Flour Basis |
|---|---|---|
| 1 | Enriched wheat flour (contains 14% wheat protein) | 100.00 |
| 2 | Yeast | 8.00 |
| 3 | Salt | 1.80 |
| 4 | Sugar | 10.00 |
| 5 | Shortening | 5.00 |
| 6 | Gluten (vital gluten) | 2.00 |
| 7 | Dough conditioner<br>Surfactant . . . monoglyceride<br>Vitamin C<br>Glucose | 1.50 |
| 8 | Homogenized dry milk | 3.00 |
| 9 | ARAKADY (trademark of an expansion agent)<br>Ingredients: $CaSO_4$ 24.00 (%)<br>$NH_4Cl$ 9.38 (%)<br>$KBrO_3$ 0.27 (%)<br>NaCl 25.00 (%)<br>Starch 40.45 (%) | 1.50 |
| 10 | Water | 60.00 |
| 11 | L-cystine | 30 ppm |

| Process for producing croissant dough | |
|---|---|
| 1. Mixing and kneading | 13 min.<br>temperature of the dough: 15° C. |
| ↓ | |
| 2. Resting the kneaded dough | 50 min.<br>temperature: 15° C. |
| ↓ | |
| 3. Stretching the bulk dough into a dough sheet | |
| ↓ | |
| 4. Applying fat to the surface of the stretched dough to form a fat layer and folding said dough to sandwich the fat layers between the folded dough layers, thereby producing a pastry dough sheet | |
| ↓ | |
| 5. dividing the pastry dough sheet into pieces | |
| ↓ | |
| 6. Shaping the pieces into a desired form | |
| ↓ | |
| 7. Fermenting the shaped dough pieces | 70 min.<br>temperature: 30° C.-32° C.<br>The dough after fermenting attains a specific volume of about 3 cc/g. |
| ↓ | |
| 8. Freezing | The dough is placed in a freezer, and kept at −30° C. for 50 min.<br>(Temperature of the dough at its center reaches −10° C. to |

| Process for producing croissant dough | |
|---|---|
| | −12° C. after 50 min.) |
| 9. Packing | The dough after freezing has a specific volume of 2.7 cc/g. |
| 10. Preserving | Preserving period: 7 to 180 days temperature: −18° C. |
| 11. Baking | 17 min. temperature: 200° C. (preheated) The dough after baking attains a specific volume of about 5.5 cc/g. |

Although we explained the special conditions for croissant dough, each type of bread dough may have its own special conditions for sufficient expansion. For example, where the dough is for French bread, the dough is preferably subjected to a temperature of about 32° C., and a humidity of about 80%, for about 90 minutes (the conventional conditions: 34° C., 80% for 70 min).

Effects of the Invention

As discussed above, where the dough is rested at least five minutes while it is maintained within a temperature range of 0° C. to 16° C. before it is stretched, as in this invention, the dough is readily stretched, without its gluten structure being damaged. In particular, where the dough is for a croissant, the dough layers and the oil and fat layers in it are maintained as they were provided in the beginning, until it is baked. Therefore, the dough expands satisfactorily when it is baked. As will be discussed below, the quality of the bread baked from the dough of this invention is better than that of the earlier application.

As mentioned above, the specific volume of a croissant produced according to the process in the preceding embodiment, in which process the dough is rested at 15° C., has a specific volume of 5.5 to 6.0 cc/g. In contrast, where the dough is rested at 20° C., with all the other conditions being the same as the conditions of the preceeding embodiment, the specific volume of the finished croissant is 5.3 to 5.6 cc/g. What is even more important is the fact that the pastry layers of the croissant baked from the former dough rested at 15° C. has a quality much better than that of the dough baked from the dough rested at 20° C. When the croissant is cut transverse to its longitudinal direction, then in its cross-sectional view the pastry layers and air pockets between them are exposed. The croissant baked from the former dough has very thin uniform pastry layers, and includes air pockets between them, which air pockets are evenly located throughout the croissant. However, the croissant baked from the latter dough includes some thick pastry layers among the thin layers, and the air pockets between the pastry layers are unevenly located.

As stated above, where dough is stretched at an ambient temperature, for example, 20° C., during the later stretching and folding step, to form pastry dough, then because of both the relatively high temperature and the pressure imparted to the dough, the dough layer tends to rebound quickly and the oil and fat layer melts and mixes with the material of the dough layer, and thus two or three dough layers become one thick layer. As a result, the croissant baked from such dough has a poor quality.

Where dough is rested at a higher temperature, the quality of the croissant baked from it becomes worse. Regarding the process in the preceding embodiment, if the dough is rested at 30° C., with all the other conditions being the same, the specific volume of a croissant baked from it is 3.5 to 4.1 cc/g, and it includes more thick layers and unevenly located air pockets between them, compared with the dough stretched at 20° C., and the layers are far more uneven than when the resting is carried out at 15° C.

Further tests have shown that the regularity of the layers of a croissant does not vary greatly if the resting temperature is between 0° C. and 16° C.

In contrast, when dough is rested at a temperature lower than 0° C., the dough starts to freeze, and it is difficult for such dough to be stretched.

Experiments show that at least five minutes are required to improve its stability after it is stretched.

Further, regarding the specific volume and the cross-sectional profile of French bread, advantages similar to those of croissants were obtained.

Therefore, by merely adding a resting step within a temperature range of 0° C. to 16° C., the method of the earlier application is greatly improved.

We claim:

1. A method of producing dough for bread or pastry comprising the steps of:
   (a) mixing and kneading materials required for producing a desired type of bread, to make a dough body having a gluten network,
   (b) resting said dough body for at least five minutes, while said dough body is maintained within a temperature range of 0° C. to 16° C.,
   (c) stretching said dough body into an elongated first form while subjecting said dough body to vibrations such that a thixotropic effect appears in the dough body and said gluten network is not damaged during the stretching step, (d) cutting and shaping said dough body into two or more dough parts each having a desired second form,
(e) fermenting said dough parts,
(f) freezing said fermented dough parts, and
(g) preserving said frozen dough parts for any desired length of time.

2. The method of claim 1, further comprising between steps (b) and (c) a step of applying fat to the surface of the stretched dough body to form a fat layer on a dough layer and folding said dough body to sandwich the fat layers between the folded dough layers, thereby producing pastry dough.

3. The method of claim 1 wherein said stretching is accomplished by pulling said dough body while subjecting said dough body to vibrations, so that a pressure of about 70 g/cm$^2$ is imparted to said dough body.

4. The method of claim 1 wherein said fermenting step comprises a step of subjecting said dough parts to a predetermined temperature and humidity for a predetermined period.

5. The method of claim 4, wherein said temperature is about 30° C., said humidity is about 80%, and said time period is about 70 minutes, where said bread is a croissant.

6. The method of claim 4, wherein said temperature is about 32° C., said humidity is about 80%, and said time period is about 90 minutes, where said bread is French bread.

7. The method of claim 2, wherein said stretching includes pulling said dough body while subjecting said dough body to vibrations, so that a pressure of no more than about 70 g/cm$^2$ is imparted to said dough body.

* * * * *